United States Patent

Bitenc

[19]

[11] Patent Number: 6,031,744
[45] Date of Patent: Feb. 29, 2000

[54] CIRCUIT ARRANGEMENT FOR SWITCHING NETWORK SECTIONS WITH SEVERAL LOAD-INDEPENDENT OUTPUT VOLTAGES

[75] Inventor: Bostjan Bitenc, Germering, Germany

[73] Assignee: Siemens Aktiengesellschaft, Munich, Germany

[21] Appl. No.: 09/142,398

[22] PCT Filed: Mar. 4, 1997

[86] PCT No.: PCT/DE97/00413

§ 371 Date: Sep. 4, 1998

§ 102(e) Date: Sep. 4, 1998

[87] PCT Pub. No.: WO97/33361

PCT Pub. Date: Sep. 12, 1997

[30] Foreign Application Priority Data

Mar. 8, 1996 [DE] Germany .......................... 196 09 123

[51] Int. Cl.[7] .............................................. H02M 7/217
[52] U.S. Cl. ................................ 363/67; 363/70; 363/89; 363/127
[58] Field of Search ................................. 363/67, 69, 70, 363/84, 89, 125, 126, 127

[56] References Cited

U.S. PATENT DOCUMENTS

| | | | |
|---|---|---|---|
| 4,631,654 | 12/1986 | Houee et al. | 363/67 |
| 4,660,136 | 4/1987 | Montorefano | 363/97 |
| 4,833,582 | 5/1989 | Kupka | 363/70 |
| 4,881,014 | 11/1989 | Okochi | 315/246 |
| 4,912,617 | 3/1990 | Hartmann et al. | 363/67 |
| 5,005,112 | 4/1991 | Kuriyama | 363/67 |
| 5,008,794 | 4/1991 | Leman | 363/67 |
| 5,119,284 | 6/1992 | Fisher et al. | 363/67 |

FOREIGN PATENT DOCUMENTS

| | | | |
|---|---|---|---|
| 0 329 841 A2 | 8/1989 | European Pat. Off. | H02M 3/335 |
| 0 499 024 A2 | 8/1992 | European Pat. Off. | H02M 3/335 |
| 2 228 152 | 8/1990 | United Kingdom | H02M 3/335 |

*Primary Examiner*—Jeffrey Sterrett
*Attorney, Agent, or Firm*—Hill & Simpson

[57] ABSTRACT

Circuit arrangement for controlling several output voltages of a converter, in which the output voltages increase in approximately the same proportion as the voltage potential adjacent to the control element of a control unit. The target value of the voltage potential dropped at the variable transistor is thereby determined dependent on the load current by means of a measurement shunt.

10 Claims, 6 Drawing Sheets

UA$_i$ : Unregulated Output Voltage $\overline{UA_i}$ : Regulated Output Voltage

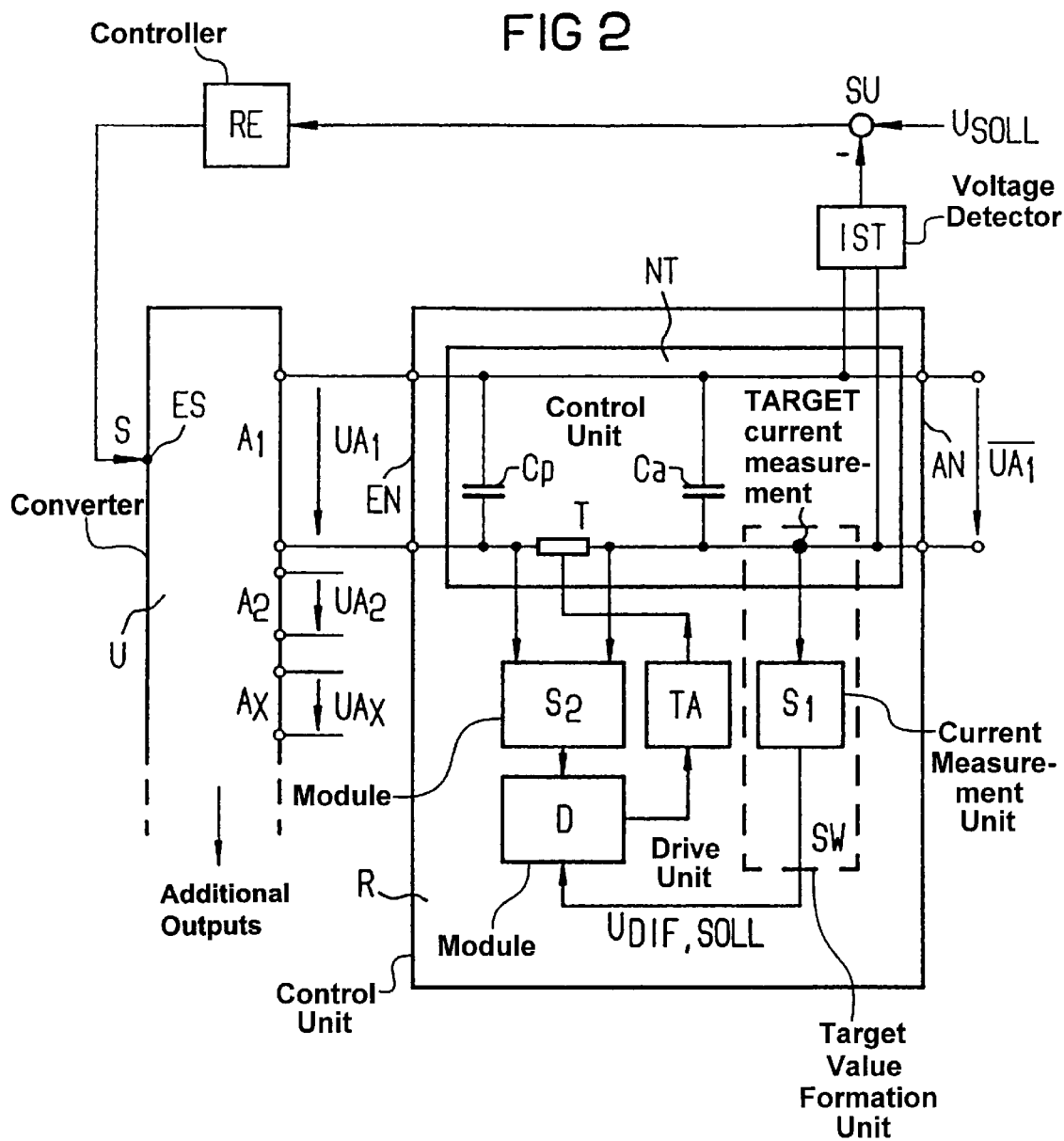

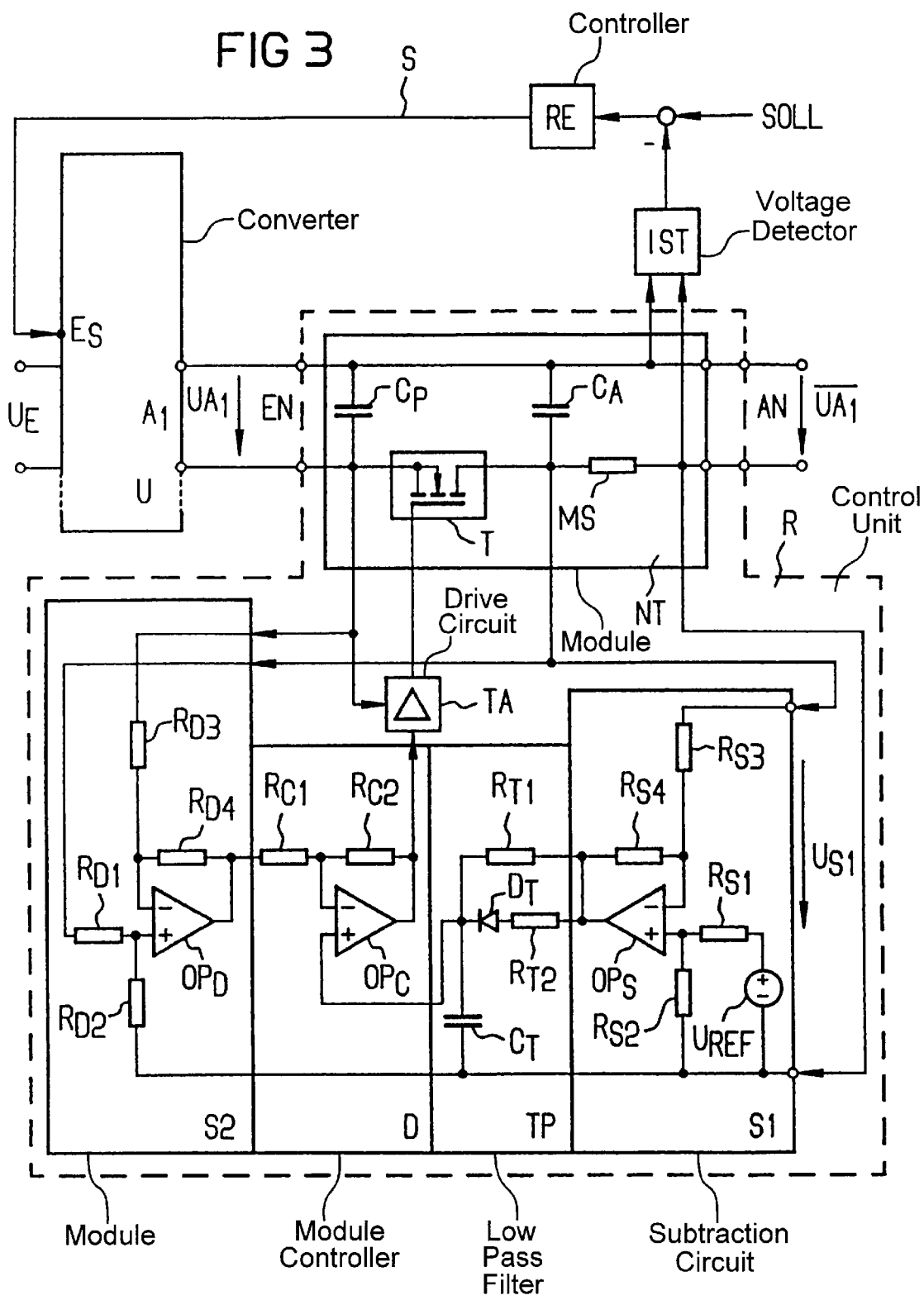

CIRCUIT ARRANGEMENT FOR SWITCHING NETWORK SECTIONS WITH SEVERAL LOAD-INDEPENDENT OUTPUT VOLTAGES

BACKGROUND OF THE INVENTION

Switched-mode power supplies with several output voltages are preferably realized by means of transformers with several output windings. In such a switched-mode power supply, a first output potential voltage $UA_1$ is regulated directly via a converter. The other output voltages $UA2, \ldots, UAx$, which can be picked off at the outputs of the converter, are respectively regulated indirectly by means of readjustment units so as to meet the requirements of the circuit arranged at the output terminals. This type of switched-mode power supply has the advantage that a multiplicity of output voltages can be produced with only one converter system. However, a disadvantage of this circuit arrangement, shown in FIG. 1a, is that the output voltage UAx to be corrected must be greater than the output voltage after a readjustment unit NRx, which output voltage is to be adapted to a load.

For example, this precondition is very difficult to maintain in the case of extreme load situations at the directly regulated circuit of the converter. Given a too-small load, in particular given no-load operation, at the directly regulated output circuit (e.g. UA1), the target potential voltages at the remaining output terminals of the converter cannot be predetermined for subsequently arranged circuits.

It was previously standard that this cited disadvantage in a switched-mode power supply as described above resulted in the following. With a previous load inserted into the directly regulated circuit, the output voltages UAi (i=2,3, . . . ) at the terminals of the converter are prevented from falling below a target potential in the case of a light load. By a corresponding dimensioning of the multi-winding transformers in the converter with an increase in the number of secondary windings, it is provided that the output potential voltages UAi are sufficiently high, even in extreme load cases on the directly regulated circuit.

The first circuit variant cited in the above section has the disadvantage that power converted into a previous load resistance is lost. Given a light loading, the efficiency of the directly regulated circuit is thereby reduced considerably.

The second circuit variant has the disadvantage that an increased output voltage at the output terminals of the converter is always adjacent to the readjustment units, i.e. even when the directly regulated circuit is not operated with a light load. A disadvantage of this circuit construction is that an increasing degradation of the efficiency of the converter occurs, above all given a higher loading of the directly regulated circuit.

The circuit variants stated above have previously been used for the optimization of a switched-mode power supply in such a way that the losses in the readjustment units were kept at a minimum over a selected load range.

Despite this optimization, in many cases of application a further disadvantage is that the possible output power of all circuits regulated by readjustment units must thereby be smaller than that of the directly regulated circuit, if the switched-mode power supply is still supposed to achieve an acceptable level of efficiency.

In cases in which several powerful output voltages are required, several converter system must also be used.

The underlying object of the invention is to indicate a simple circuit arrangement in which the above-stated disadvantages can be avoided.

In general terms the present invention is a circuit arrangement with several output rectifier circuits for regulating several output voltages of a converter, of which a first output voltage controls the converter by a first output signal. At least one further output voltage is kept constant by a respective readjustment element. A control unit is provided that is connected to the first output rectifier circuit and that regulates the first output voltage. In the control unit a first module is provided for the determination of a first voltage potential at a measurement shunt arranged in series with the control element, and a second module is provided for the determination of a second voltage potential at the switching element. The output of the first module is connected with a first input and the output of the second module is connected with a second input of a third module for the difference value formation. The output of the third module is connected with the control input of the control element.

Advantageous developments of the present invention are as follows.

The first and second modules form a subtraction circuit.

The third module is a PDI controller.

The third module is a P-controller.

The control element is an MOSFET transistor.

A low-pass filter is arranged between the output of the first module and the first input of the third module.

A first capacitor is arranged between an input terminal pair of the control unit, and a second capacitor is arranged between the output of the control element and a terminal of an output terminal pair of the control unit.

A phase control unit is arranged in the feedback circuit forming the control signal for the converter.

The phase control unit is formed with a subtraction amplifier.

The voltage supply of the phase control element can be picked off directly at the converter.

Alongside the advantage that the output voltages, given extreme regulation conditions at the terminals of the directly regulated output voltage, the specified values of the further output voltages are maintained, the invention has the further advantage that fewer losses are produced than in the described solution strategies, and the efficiency is thereby decisively improved.

The invention has the advantage that the circuit arrangement can be dimensioned in such a way that the output power of the corrected circuits is higher than that of the directly regulated circuit. This has the further advantage that further converter systems within the switched-mode power supply are saved, and that the manufacturing costs thereof are thereby significantly reduced.

A further construction of the invention has the advantage that it is always possible to pick off sufficient voltage potential at the output terminals of the converter, and that the corrected output voltages UAi (1, 2 . . . ,3) are independent of a change of load on the directly regulated circuit.

A further construction of the invention has the advantage that, in particular given no-load operation of the directly regulated output circuit, a low-frequency oscillation of the output voltage at the converter does not occur.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 shows a construction of a directly regulated circuit,

FIG. 3 shows a circuit-oriented realization of a module integrated into the directly regulated circuit.

DESCRIPTION OF THE PREFERRED EMBODIMENTS

Converters with several output voltages are preferably realized by means of transformers with several output windings. In this type of circuit, at least one output voltage is regulated directly by means of a feedback circuit between the output and the input of the converter, while the remaining output voltages, which can be picked off at the output terminals of the converter, are indeed modified by the feedback, but however can be matched indirectly in individual fashion to a consumer or, respectively, to a load by means of a readjustment element.

This type of circuit has the advantage that a multiplicity of output voltages can be produced with only one converter system. In the direct-feedback control circuit, the output voltage of the converter is compared, as an actual voltage potential, with a target voltage potential, and a voltage potential difference is supplied to the converter via a control unit, again as a manipulated variable. The output voltages of the converter are increased or reduced according to the target value deviation.

Figure 1A:
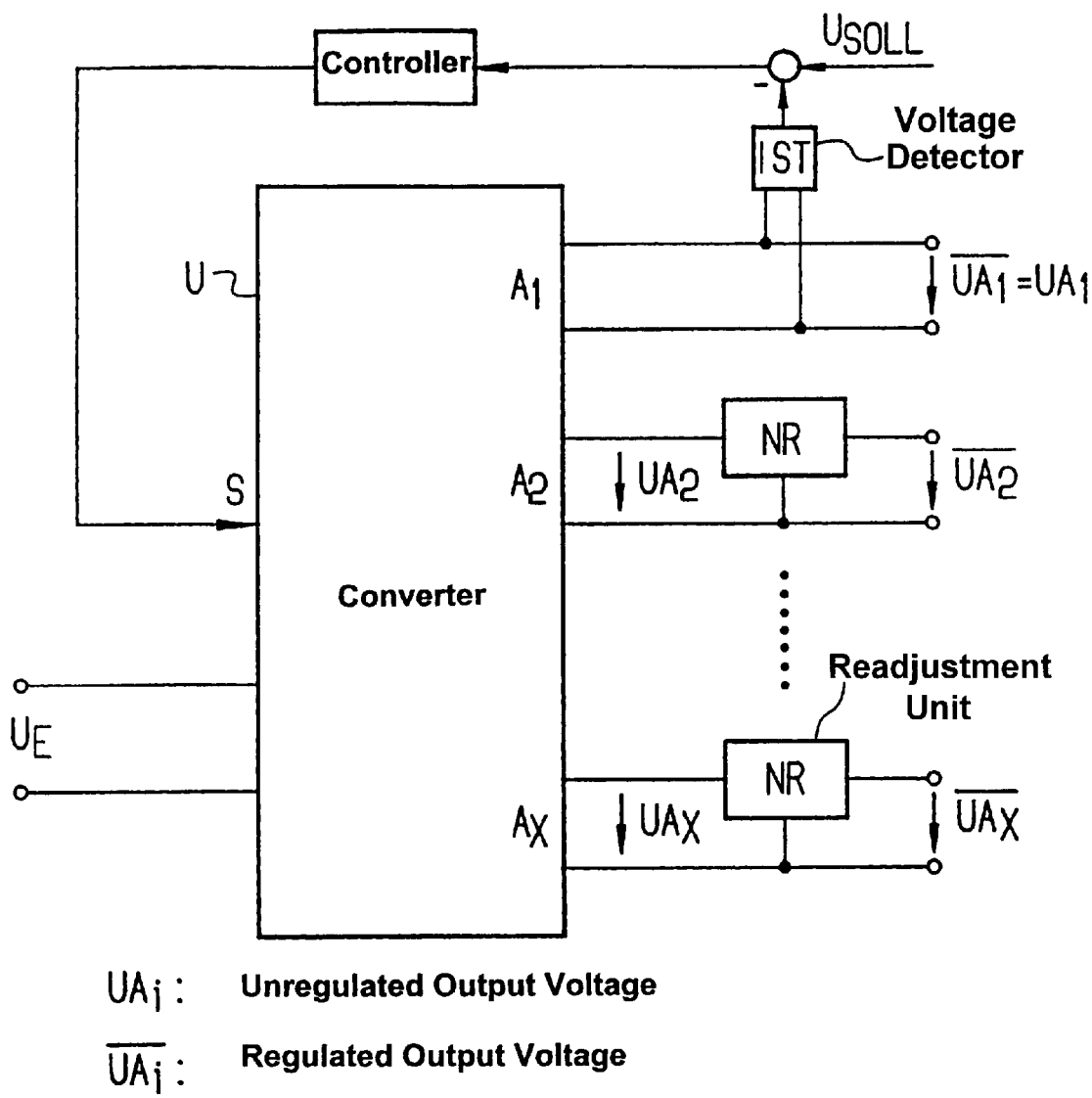
FIG. 1a shows a switched-mode power supply with several output voltages.

The circuit arrangement shown in FIG. 1a reproduces the prior art, and has already been mentioned in the introduction to the specification. In this circuit arrangement, the voltage potential UA1, which can be picked off at a first output A1 of the converter U (via voltage detector IST), is used for the regulation of the converter U, and thus also for the presetting of the further output voltages UA2 to UAx adjacent to the output A2 . . . , AX of the converter U. For better matching to the respective load situations at the terminals A2 to Ax of the converter U, a readjustment unit NR is respectively connected between the output terminal A to Ax of the converter U and the circuits connected to this converter. In the directly regulated control circuit, a comparison of the actual voltage potential with the target voltage potential is carried out, and the potential difference resulting from the comparison is again supplied to the converter U as an adjustment potential S, via a control unit R, fashioned in particular as an integrator.

Figure 1B:
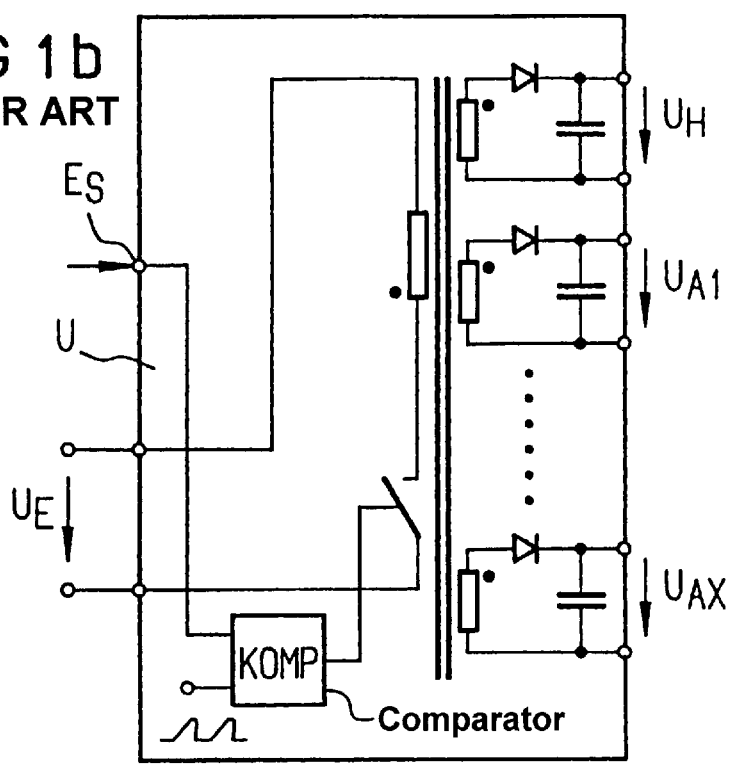
FIGS. 1b, 1c shows circuit constructions of the switched-mode power supply.
Figure 1C:
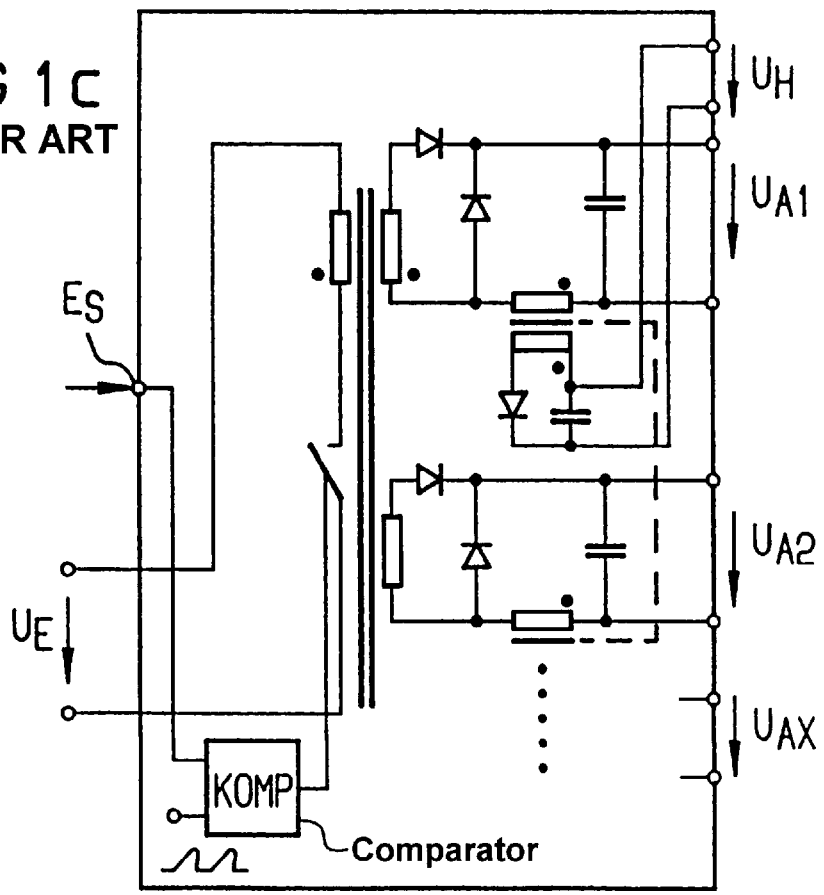

FIG. 1b shows an isolating transformer, and FIG. 1c shows a flow converter, the two of which can be integrated in the converter U.

FIG. 2 shows a control unit R for the directly regulated circuit. This control unit R is divided into the individual functional units:

as the target value formation unit SW with a current measurement unit S1 for the predetermination of a voltage potential difference value UDIF,SOLL, a drive unit TA for the control element T, and a module S2 adjacent to the control element T, for the determination of the difference voltage UDIF adjacent to the control element T.

Both the pair of terminals EN of the control unit R at the input side and also the output terminal pair AN are connected with a capacitor Cp, or, respectively, Ca. The output voltage potential UA1 of the control unit R is the actual voltage potential for the control voltage S of the converter U. The voltage potential that can be picked off at the output terminal pair AN is subtracted from a target voltage potential value USOLL at a summation point SU. The difference is supplied to the converter, again as a manipulated variable S, via a controller RE. A controller with an I-portion can be used as a controller RE. In order to enable sufficient supplying of the output voltages UAx, which are to be separately replenished, in case of light load or in no-load operation on the directly regulated circuit, this voltage potential is raised.

The raising of the output voltages UA2, . . . ,UAn at the output terminals A2, . . . An can be achieved in that, with the aid of a transistor T, a difference voltage UDIF=UA1−$\overline{UA1}$ is set up in the directly regulated feedback circuit. Since the voltage $\overline{UA1}$ is always regulated to the same voltage value, the voltage potential at the transformer winding of the converter U or, respectively, at the pulse capacitor Cp arises at the value $\overline{UA1}$+UDIF. The voltage potentials UAi (i=2, 3 . . . ) at the additional outputs of the converter U increases approximately in the same proportion as the output voltage UA1. The target value for UDIF,SOLL is determined dependent on the load current IA1

UDIF,SOLL=f(IA1)

and is equal to zero for larger IA1. The additional losses (UDIF,SOLL*IA1) are thus small, and in no-load operation or equal to zero.

In FIG. 3, a circuit-oriented construction of the circuit arrangement NR shown schematically in FIG. 2 is reproduced.

In this embodiment, the modules 31, S2 respectively comprise amplifier elements OPS, OPD, and the module D comprises a feedback operational amplifier OPC. The module NT is formed essentially from the capacitors CPLUS, CAUS arranged at the inputs thereof, as well as a controllable control element T arranged between these capacitors.

The output current IA1 is converted into an equivalent voltage potential by means of a measurement shunt MS arranged at the output of the module NT. From this voltage potential, a voltage potential target value is formed for a load-dependent difference voltage potential UDIF,SOLL. One possibility for achieving this is given by the following constant function in the form

UDIF,SOLL=UREF−US1.

This linear relation can be achieved by means of a subtraction circuit S1, formed from the resistors RS1, RS2, RS3, RS4, as well as the operational amplifier OPS.

In order better to be able to bridge over sudden load variations at the output AN of the computing unit R, a low-pass TP is integrated between the module S1 and an amplifier element R2. By means of the elements RT1, RT2, DT and CT of this module TP, an increase in the voltage potential is on the one hand relayed without delay to subsequently connected circuit elements given a sudden loading at the output An of the module NT, and, on the other hand, a voltage decrease is relayed with a delay to subsequently connected circuit elements given an unloading at the terminals. For the measurement of UDIF,SOLL, a second subtraction circuit S2, formed from the resistors RD1, RD2, RD3 and RD4, as well as from the operational amplifier OPD, is provided. A module D, connected after the second subtraction circuit and formed from the resistors RC1, RC2 and an operational amplifier OPC. Besides arbitrary controller types, such as for example a PID controller, P-controllers can also be used as controllers (as shown in the module D). A drive circuit TA for the control element T, for example a MOSFET transistor T, is required when the output voltage of the operational amplifier OPC of the controller D is not large enough. The simplest realization of this driver unit is a transistor in common-emitter connection.

Figure 4:
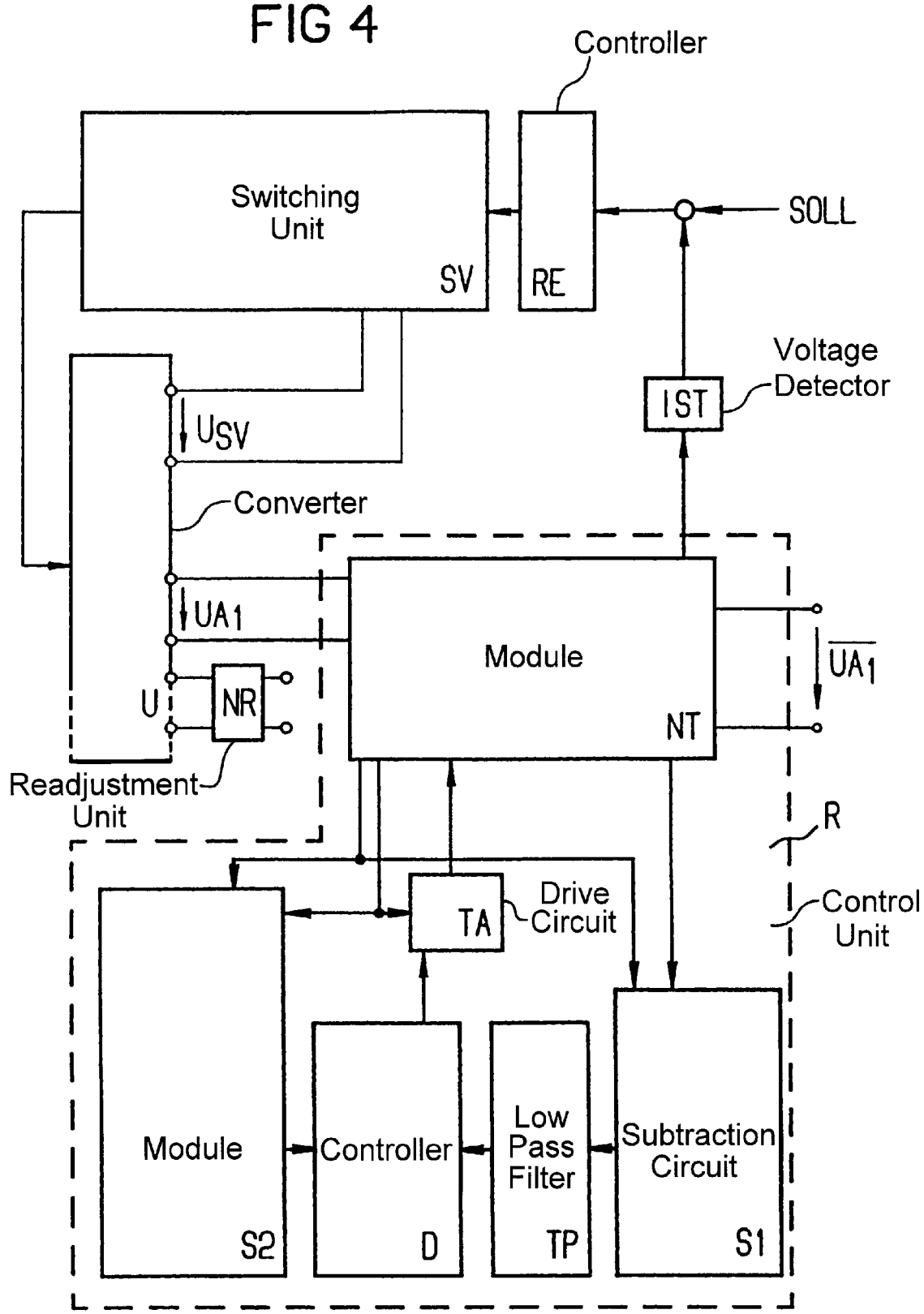
FIG. 4 shows a schematic representation of a further embodiment.

FIG. 4 shows a schematic circuit arrangement of a switched-mode power supply, in which the already-described control unit R of the converter U is reproduced. In this embodiment, it is additionally taken into account that the phase of the controlled system (transmission function (UA1/USMOD) is also sufficiently large given low excitation frequencies, and no low-frequency oscillations can thus occur. This is achieved by the feeding back of UA1 or of a voltage proportional thereto (e.g. USV at a primary-side auxiliary winding) to the control signal S.

This switching unit SV is of particular advantage if, at the output terminals AN of the directly regulated circuit, a small load or no load is connected to the output terminals of R. As specified above, the control unit R makes it possible for the additional output voltages UA2, . . . , UAn of the converter U to be supplied sufficiently with a voltage potential even given a light load at the output of the directly regulated circuit with a sufficient voltage. The circuit-oriented realization for increasing the phase margin of the controlled system is shown in the upper part of the circuit arrangement shown in FIG. 4 as well as in FIG. 5.

Figure 5:
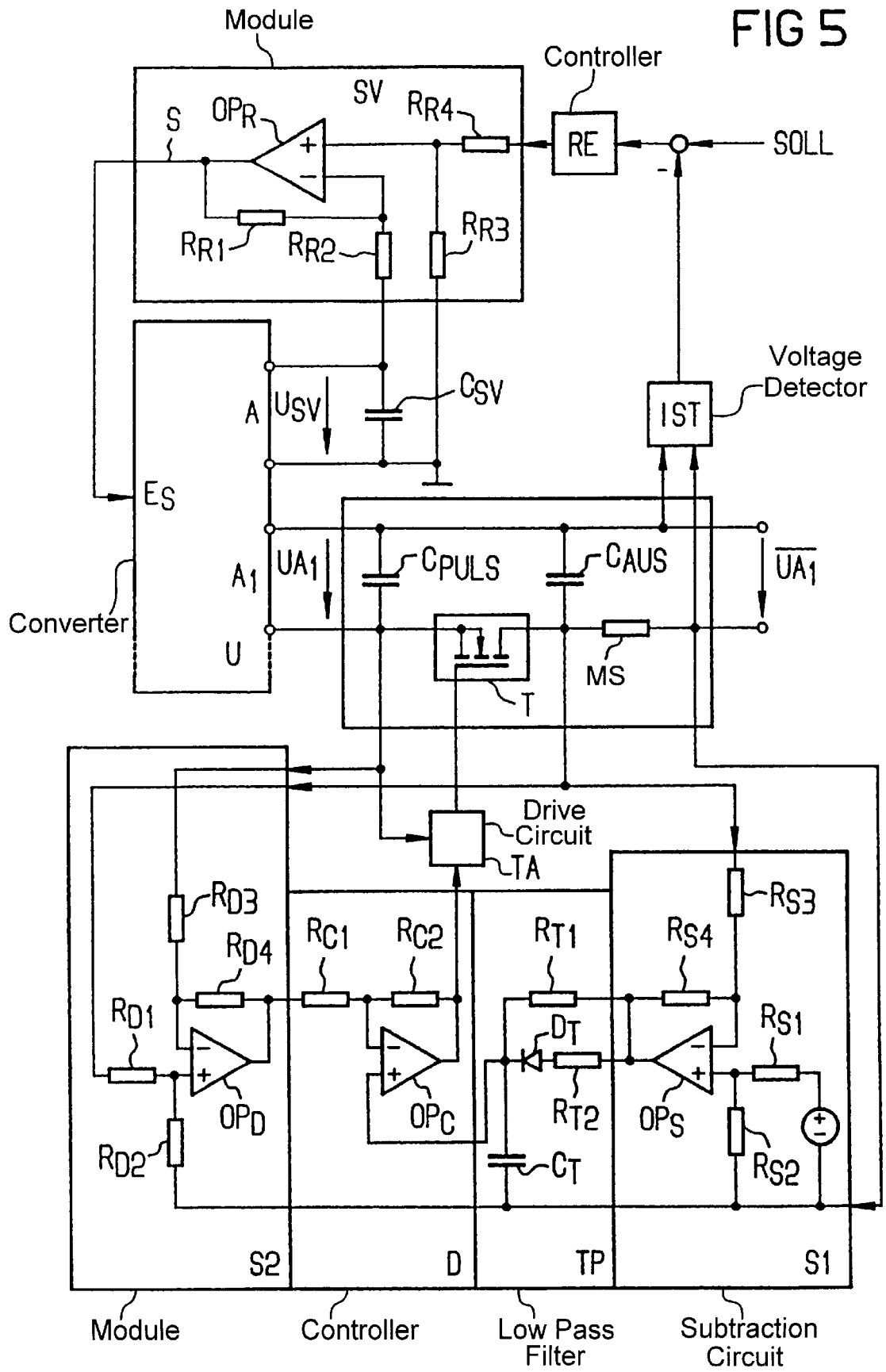
FIG. 5 shows a circuit-oriented construction of the further embodiment.

FIG. 5 illustrates the circuit-oriented realization of the embodiment of the circuit arrangement shown in FIG. 4. A comparison of actual with target voltage potential is thereby carried out between the output voltage corrected by the control unit R, such as e.g. $\overline{UA1}$ of the converter U, and a target potential value USOII. A potential voltage resulting from the actual-target voltage potential comparison is relayed to a controller RE, which for example also has an I-portion in this embodiment. The integrated comparison voltage is again applied to the input ES of the converter U as a manipulated variable S, via the additional module SV. A feedback operational amplifier OPR is arranged in the module SV. A voltage supply of the operational amplifier OPR can be picked off directly from UA1, given a non-metallically separated construction of the converter U, or, given a metallic separation between the input and output voltage within the converter U, a voltage USV proportional to UA1 can be picked off at the output A. For the smoothing of the output voltage USV, a capacitor CSV is inserted between the terminals A. Given a metallic separation inside the converter U, a voltage potential supply of the module SV can for example be picked off is at a primary-side auxiliary winding of the converter U.

At the operational amplifier OPR arranged in the module SV, a first input is connected via a resistor RR3 to a ground reference potential of the output terminals A, of the converter U, and via a further resistor RR4 with the output of the control circuit R. The second input of the operational amplifier OPR is connected via a resistor RR2 with the voltage potential of the converter U, which can be picked off at the output terminal A. The control signal S adjacent to the output of the module is relayed to the input Es of the converter U.

By means of the introduction of the module SV, it is provided that the phase of the transmission function UA1/USMOD is always sufficiently large, and thus that low-frequency oscillations cannot occur.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement, comprising:

a plurality of output rectifier circuits for respectively regulating a plurality of output voltages of a converter, of which a first output voltage controls the converter by a first output signal;

at least one further output voltage that is kept constant by a respective readjustment element;

a control unit connected to the first output rectifier circuit and regulating the first output voltage;

in the control unit a first module for determining a first voltage potential at a measurement shunt arranged in series with a control element, and a second module for determining a second voltage potential at the control element;

an output of the first module connected with a first input of a third module and an output of the second module connected with a second input of the third module for a difference value formation; and an output of the third module connected with the control input of the control element.

2. The circuit arrangement according to claim 1, wherein the first and second modules form a subtraction circuit.

3. The circuit arrangement according to claim 1, wherein the third module is a PDI controller.

4. The circuit arrangement according to claim 1, wherein the third module is a P-controller.

5. The circuit arrangement according to claim 1, wherein the control element is a MOSFET transistor.

6. The circuit arrangement according to claim 1, wherein a low-pass filter is connected between the output of the first module and the first input of the third module.

7. The circuit arrangement according to claim 1, wherein a first capacitor is connected between an input terminal pair of the control unit, and a second capacitor is connected between the output of the control element and a terminal of an output terminal pair of the control unit.

8. The circuit arrangement according to claim 1, wherein a phase control unit is connected in a feedback circuit forming the control signal for the converter.

9. The circuit arrangement according to claim 8, wherein the phase control unit is formed with a subtraction amplifier.

10. The circuit arrangement according to claim 8, wherein a voltage supply of the phase control element is derived directly from the converter.

* * * * *